US006475946B1

(12) United States Patent
Rix

(10) Patent No.: US 6,475,946 B1
(45) Date of Patent: Nov. 5, 2002

(54) OLEFIN POLYMERIZATION CATALYSIS WITH ARYL SUBSTITUTED CARBENIUM CATIONIC COMPLEXES

(75) Inventor: Francis C. Rix, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/693,300

(22) Filed: Oct. 20, 2000

Related U.S. Application Data

(60) Provisional application No. 60/160,941, filed on Oct. 22, 1999.

(51) Int. Cl.[7] ................................................ B01J 31/38
(52) U.S. Cl. ....................... 502/104; 502/117; 502/152; 502/155; 526/127; 526/160; 526/161
(58) Field of Search ................................ 526/127, 129, 526/160, 161, 133, 134; 502/104, 117, 118, 152, 155

(56) References Cited

U.S. PATENT DOCUMENTS

| 4,543,399 A | 9/1985 | Jenkins, III et al. |
| 4,588,790 A | 5/1986 | Jenkins, III et al. |
| 4,871,705 A | 10/1989 | Hoel |
| 4,892,851 A | 1/1990 | Ewen et al. |
| 4,937,299 A | 6/1990 | Ewen et al. |
| 5,001,205 A | 3/1991 | Hoel |
| 5,017,714 A | 5/1991 | Welborn, Jr. |
| 5,028,670 A | 7/1991 | Chinh et al. |
| 5,153,157 A | 10/1992 | Hlatky et al. |
| 5,198,401 A | 3/1993 | Turner et al. |
| 5,241,025 A | 8/1993 | Hlatky et al. |
| 5,278,119 A | 1/1994 | Turner et al. |
| 5,278,264 A | 1/1994 | Spaleck et al. |
| 5,288,677 A | 2/1994 | Chung et al. |
| 5,296,433 A | 3/1994 | Siedle et al. |
| 5,296,434 A | 3/1994 | Karl et al. |
| 5,304,614 A | 4/1994 | Winter et al. |
| 5,308,816 A | 5/1994 | Tsutsui et al. |
| 5,312,881 A | 5/1994 | Marks et al. |
| 5,318,935 A | 6/1994 | Canich et al. |
| 5,324,800 A | 6/1994 | Welborn, Jr. et al. |
| 5,352,749 A | 10/1994 | DeChellis et al. |
| 5,382,638 A | 1/1995 | Bontemps et al. |
| 5,405,922 A | 4/1995 | DeChellis et al. |
| 5,408,017 A | 4/1995 | Turner et al. |
| 5,427,991 A | 6/1995 | Turner |
| 5,436,304 A | 7/1995 | Griffin et al. |
| 5,447,895 A | 9/1995 | Marks et al. |
| 5,462,999 A | 10/1995 | Griffin et al. |
| 5,463,999 A | 11/1995 | Taruya et al. |

(List continued on next page.)

FOREIGN PATENT DOCUMENTS

| EP | 0 277 003 A | 8/1988 |
| EP | 0 277 004 A | 8/1988 |
| EP | 0 129 368 B | 7/1989 |
| EP | 0 418 044 A | 3/1991 |
| EP | 0 570 982 B | 11/1993 |
| EP | 0 577 581 A | 1/1994 |
| EP | 0 578 838 A | 1/1994 |
| EP | 0 591 756 B | 4/1994 |
| EP | 0 426 637 B | 4/1995 |
| EP | 0 707 014 A1 | 4/1996 |
| WO | WO 91/09882 | 7/1991 |
| WO | WO 92/00333 | 1/1992 |
| WO | WO 92/10066 | 6/1992 |
| WO | WO 93/02099 | 2/1993 |
| WO | WO 93/11172 | 6/1993 |

(List continued on next page.)

OTHER PUBLICATIONS

Lambert et al., A Stable β–Silyl Carbocation, JACS, 1996, 118, 7867–7868.*
Bank et al., Substituent Effect on the Electrochemical Oxidation of Trityl Anions, JOC, vol. 46, No. 7, 1981, 1243–47.*
"On Line Determination by Light Scattering of Mechanical Degradation in the GPC Process", J.G. Rooney and G. Ver Strate, pp. 207–235 in *Liquid Chromatography of Polymers and Related Materials III*, Jack Cazes, ed., Marcel Dekker, Inc., New York (1981).
*JACS*, v.116 (1994)—pp. 6435–6436, Baird, Michael C., et al.
*Chemical Reviews*, v.93(3), May, 1993, pp. 927–942, S. H. Strauss, "The Search for Larger and More Weadly Coordinating Anions".
*Acc. Chem. Res.*, v.31 (1998)—pp. 133–139, Christopher A. Reed, "Carboranes: A New Class of Weadly Coordinating Anions for Strong Electrophiles, Oxidants, and Superacids".
*Organometallics*, v.13 (1994)—pp. 954–963—Walter Spaleck, et al., "The Influence of Aromatic Substituents on the Polymerization Behavior of Brdiged Zirconocene Catalysts".

(List continued on next page.)

Primary Examiner—David W. Wu
Assistant Examiner—R. Harlan
(74) Attorney, Agent, or Firm—Charles E. Runyan

(57) ABSTRACT

This description addresses a process for the preparation of polyolefins from one or more olefinic monomers comprising combining under polymerization conditions said olefins with the product of combining i) an organometallic catalyst compound and ii) a cocatalyst complex comprising a trialkylsilyl-substituted carbenium cation and a suitable non-coordinating or weakly coordinating anion. These complexes exhibit good solubility in aliphatic solvents such that use in aliphatic solution based polymerization reaction processes can be conducted without the use of aromatic solvents or co-solvents and without the need for slurry means of introduction into chemical reaction environments. High number-average molecular weight polymers and copolymers at high rates of productivity were observed from the use of metallocene catalysts complexes when activated with $[(3,5-(Et_3Si)_2Ph)_3C]^+[(C_6F_5)B]^-$ and used in a hexane-based solution polymerization.

8 Claims, No Drawings

U.S. PATENT DOCUMENTS

| | | | |
|---|---|---|---|
| 5,502,017 A | * | 3/1996 | Marks et al. ............... 502/103 |
| 5,502,124 A | | 3/1996 | Crowther et al. |
| 5,504,049 A | | 4/1996 | Crowther et al. |
| 5,635,573 A | | 6/1997 | Harrington et al. |
| 5,668,234 A | | 9/1997 | Rhodes et al. |
| 5,688,634 A | | 11/1997 | Mixon et al. |
| 5,763,556 A | | 6/1998 | Shaffer et al. |
| 5,767,208 A | | 6/1998 | Turner et al. |
| 5,851,945 A | | 12/1998 | Turner et al. |
| 5,895,771 A | | 4/1999 | Epstein et al. |
| 5,939,347 A | | 8/1999 | Ward et al. |
| 6,294,495 B1 | | 9/2001 | Matsunaga ................. 502/103 |
| 6,403,773 B1 | | 6/2002 | Christopher et al. |

FOREIGN PATENT DOCUMENTS

| | | |
|---|---|---|
| WO | WO 93/14132 | 7/1993 |
| WO | WO 93/19103 | 9/1993 |
| WO | WO 94/01471 | 1/1994 |
| WO | WO 94/03506 | 2/1994 |
| WO | WO 95/07941 | 3/1995 |
| WO | WO 95/07942 | 3/1995 |
| WO | WO 96/23010 | 8/1996 |
| WO | WO 96/33227 | 10/1996 |
| WO | WO 96/40805 | 12/1996 |
| WO | WO 97/22635 | 6/1997 |
| WO | WO 97/22639 | 6/1997 |
| WO | WO 97/29845 | 7/1997 |
| WO | WO 97/35893 | 10/1997 |
| WO | WO 97/48735 | 12/1997 |
| WO | WO 98/03558 | 1/1998 |
| WO | WO 98/37106 | 8/1998 |
| WO | WO 98/41530 | 9/1998 |
| WO | WO 98/55518 | 12/1998 |
| WO | WO 99/06135 | 2/1999 |
| WO | WO 99/09306 | 2/1999 |
| WO | WO 99/30822 | 6/1999 |
| WO | WO 99/42467 | 8/1999 |
| WO | WO 99/43717 | 9/1999 |
| WO | WO 99/45042 | 9/1999 |
| WO | 00/24793 A | 5/2000 |

OTHER PUBLICATIONS

*Organometallics*, v.13 (1994)—pp. 964–970—Udo Stehling, et al., "ansa–Zirconocene Polymerization Catalysts with Annelated Ring Ligands—Effects on Catalytic Activity and Polymer Chain Length".

*Chem. Commun.*, (1998)—pp. 849–850—George J.P. Britovsek, et al., "Novel Olefin Polymerization Catalysts Based on Iron and Cobalt".

*Organometallics*, v.14 (1995)—pp. 5478–5480—John D. Scollard, et al., "Sterically Demanding Diamide Ligands: Synthesis and Structure . . . ".

*Macromolecules*, v.29 (1996)—pp. 5241–5243—John D. Scollard, et al., "Polymerization of α–Olefins by Chelating Diamide Complexes of Titanium . . . ".

*Angewandte Chemie, Int. Ed.*, v.38 (1999)—pp. 428–447, Vernon C. Gibson, et al., "The Search for New–Generation Olefin Polymerization Catalysts: Life Beyond Metallocenes".

*J. of Organometallic Chem.*, v.369(1989)—pp. 359–370—Helga Wiesenfeldt, et al., "ansa–Metallocene Derivatives. XVII—Racemic and meso diastereomers of Group IV Metallocene Derivatives with Symmetrically Substituted, Dimethylsilanediyl–bridged Ligand Frameworks . . . ".

*Coordination Chemistry Reviews*, v.181 (1999), pp. 243–296—Gregory G. Hlatky, "Metallocene Catalysts for Olefin Polymerization".

L. Olsson et al., "Evidence for the Existence of Silylium Cations in Condensed Phase" *Chemical Physics Letters*, v.215(5), 1993—pp. 433–443.

GKS Prakash et al., Preparation, Si and C NMR and DFT/IGLO Studies of Silylcarboxonium Ions—J. of Organometalic Chem., v.550(1–2), Jan., 1998—pp. 119–123.

J–B Kim et al., "Effect of Acid Structure on Deprotection o Poly(2–trimethylsilyl–2–p ropyl methacrylate)"—*Polymer*, v.40(14), Jun., 1999—pp. 4055–4061.

RVC Carr, et al., "Dienophilic Properties of Phenyl Vinyl Sulfone . . . "—*J. Org. Chem.*, v.48(25), 1983—pp. 4976–4986.

JS Hrkach et al., "Reaction of 2–Methyl–2Oxaxoline With Trimethylsilyl Initiators An Unusual Mode of Ring Opening"—*Macromolecules*, Apr., 1992, v. 25(8)—pp. 2071.

\* cited by examiner

OLEFIN POLYMERIZATION CATALYSIS WITH ARYL SUBSTITUTED CARBENIUM CATIONIC COMPLEXES

This Application claims the benefit of and priority to U.S. Provisional Application No. 60/160,941, filed Oct. 22, 1999.

TECHNICAL FIELD

This invention relates to the preparation of olefin polymers using catalyst systems based on ionic cocatalysts for organometallic or organometalloid catalyst complexes where the cocatalysts comprise carbenium-based cations and noncoordinating or weakly coordinating anions.

BACKGROUND ART

The term "noncoordinating anion" is now accepted terminology in the field of olefin and vinyl monomer polymerization, both by coordination or insertion polymerization and carbocationic polymerization. See, for example, EP 0 277 003, EP 0 277 004, U.S. Pat. Nos. 5,198,401, 5,278,119, Baird, Michael C., et al, J. Am. Chem. Soc. 1994, 116, 6435–6436, U.S. Pat. Nos. 5,312,881, 5,502,017, 5,668,234, and WO 98/03558. The noncoordinating anions are described to function as electronic stabilizing cocatalysts, or counterions, for essentially cationic metallocene complexes which are active for polymerization. The term noncoordinating anion as used here applies both to truly noncoordinating anions and coordinating anions that are at most weakly coordinated to the cationic complex so as to be labile to replacement by olefinically or acetylenically unsaturated monomers at the insertion site. These noncoordinating anions can be effectively introduced into a polymerization medium, or premixed with an organometallic catalyst compound prior to introduction into the polymerization medium, as Bronsted acid salts containing charge-balancing countercations, ionic cocatalyst compounds. See also, the review articles by S. H. Strauss, "The Search for Larger and More Weakly Coordinating Anions", Chem. Rev., 93, 927–942 (1993) and C. A. Reed, "Carboranes: A New Class of Weakly Coordinating Anions for Strong Electrophiles, Oxidants and Superacids", Acc. Chem. Res., 31, 133–139 (1998).

Both of U.S. Pat. No. 5,198,401 and WO 97/35893 specifically address nitrogen-containing Bronsted acid cations capable of donating a proton, to suitable Lewis acidic organometallic catalyst compounds, as part of ionic cocatalyst compounds that in turn are capable of activating said organometallic compounds by rendering them cationic and providing a compatible, counterbalancing noncoordinating anion. U.S. Pat. No. 5,198,401 describes catalyst activator compounds represented by the formula $[(L'-H)^+]_d[(M')^{M+}Q_1Q_2 \ldots Q_n]^{d-}$ where L' is a neutral base, H is a hydrogen atom and $[(M')^{m+}Q_1Q_2 \ldots Q_n]$ is a metal or metalloid atom subtended by a variety of ligands, preferably where M is boron and two or more of $Q_n$ are aromatic radicals, such as phenyl, napthyl and anthracenyl, each preferably fluorinated. L' is illustrated with various trialkyl-substituted ammonium complexes and N,N-dialkylanilinium complexes. WO 97/35893 describes cocatalyst activator compounds represented by the formula $[L^*-H]^+[BQ'_4]^-$ where L* includes nitrogen containing neutral Lewis bases, B is boron in an oxidation state of 3, and Q' is a fluorinated $C_{1-20}$ hydrocarbyl group, preferably a fluorinated aryl group. The cocatalyst compounds are said to be rendered soluble in aliphatic solvents by incorporation of olephilic groups, such as long chain alkyl or substituted-alkyl groups, into the Bronsted acid L*. Bis(hydrogenated-tallowalkyl) methylammonium and di(dicosyl)methylammonium salts are exemplified.

EP 0 426 637 describes the use of the cocatalyst compound non-substituted triphenylcarbenium tetrakis (pentafluorophenyl)boronate as a proton-free ionizing agent that abstracts a metal ligand to form a catalytically active metallocene cation and a loosely coordinated anion. U.S. Pat. No. 5,502,017 addresses ionic metallocene catalysts for olefin polymerization comprising, as a cocatalyst component, a weakly coordinating anion comprising boron substituted with halogenated aryl substituents preferably containing silylalkyl substitution, such as para-silyl-t-butyldimethyl. This substitution is said to increase the solubility and thermal stability of the resulting metallocene salts. Examples 3–5 describe the synthesis and polymerization use of the cocatalyst compound triphenylcarbenium tetrakis (4-dimethyl-t-butylsilyl-2,3,5,6-tetrafluorophenyl) borate.

Olefin solution polymerization processes are generally conducted in aliphatic solvents that serve both to maintain reaction medium temperature profiles and solvate the polymer products prepared. However, aryl-group containing activators, such as those having phenyl derivatives and other fused or pendant aryl-group substituents, are at best sparingly soluble in such solvents and typically are introduced in aryl solvents such as toluene. Solution polymerization processes in aliphatic solvents thus can be contaminated with toluene that must be removed to maintain process efficiencies and to accommodate health-related concerns for both industrial manufacturing processes and polymer products from them. Alternatively, relatively insoluble catalyst components can be introduced via slurry methods, but such methods required specialized handling and pumping procedures that complicate and add significant costs to industrial scale plant design and operation. Low solubility can also become disadvantageous should the process involve low temperature operation at some stage such as in typical adiabatic processes run in areas subject to low ambient temperatures. Additionally, separating or counteracting the build up in the recycle system of aromatic catalyst solvents may become another problem. At the same time means of maintaining high molecular weights in olefin polymers while operating at economically preferable high polymerization reaction temperatures and high polymer production rates is highly desirable. It is therefore desirable to identify olefin polymerization cocatalyst activators which are active for polymerization, particularly at elevated temperatures, which are more soluble in aliphatic solvents.

BRIEF SUMMARY OF THE INVENTION

This invention addresses a process for the preparation of polyolefins from one or more olefinic monomers comprising combining under polymerization conditions said olefins with the reaction product of i) a transition metal organometallic catalyst compound and ii) a cocatalyst complex comprising a trialkylsilyl-substituted carbenium cation and a noncoordinating or weakly coordinating anion. The cocatalysts of the invention provide carbon compound by-products and weakly coordinating, stabilizing anions for essentially cationic transition metal organometallic catalyst complexes that exhibit high polymerization activities.

DETAILED DESCRIPTION OF THE INVENTION

The invention provides a process for olefin polymerization in which anion-containing cocatalyst complexes and organometallic catalyst precursor compounds can be combined to form active catalysts for olefin polymerization. Subsequent contacting, or in situ catalyst formation essentially concurrent with said contacting, with insertion polymerizable monomers, those having accessible olefinic, acetylenic unsaturation, or with monomers having olefinic unsaturation capable of cationic polymerization. The catalyst according to the invention is suitable for preparing polymers and copolymers from olefinically and acetylenically unsaturated monomers.

The invention cocatalyst complexes can be represented by the following formula:

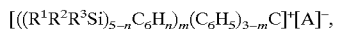

where each of $R^1$, $R^2$, and $R^3$ is independently a substituted or unsubstituted $C_1$ to $C_{32}$ hydrocarbyl group, n=1–4, m=1–3, and $[A]^{31}$ is any noncoordinating or weakly coordinating anion suitable for use in olefin polymerization. Typically $[A]^-$ is a halogenated, tetraryl-substituted Group 10–15 non-carbon, element-based anion, especially those that are have fluorine groups substituted for hydrogen atoms on the aryl groups, or on alkyl substituents on those aryl groups.

For illustration purposes trialkylsilyl group-substituted phenyl groups may be independently selected from the groups depicted below:

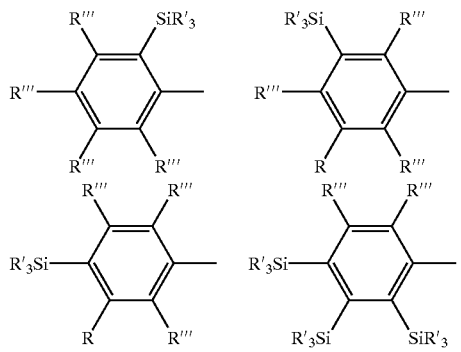

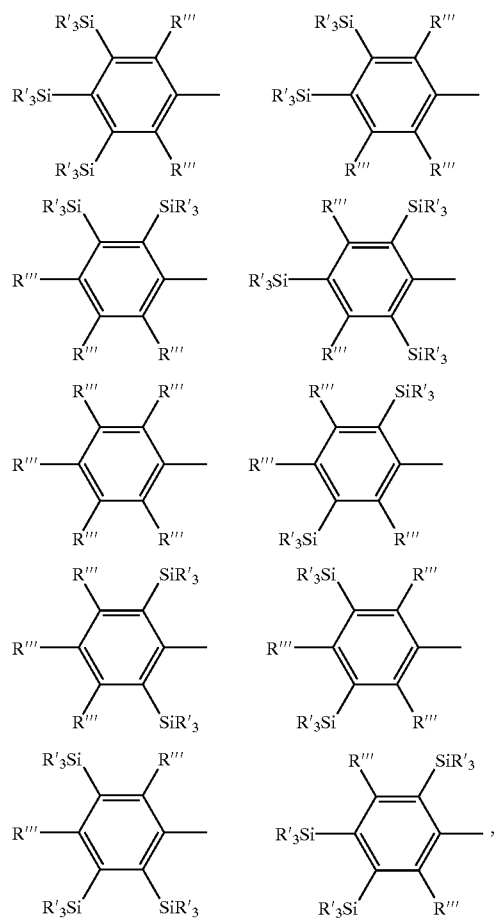

where any R' is independently any of the groups below except H and any R''' is independently any of the groups below:

| | | | |
|---|---|---|---|
| H | CH(CH$_3$)$_2$ | C$_4$H$_7$ | CH$_2$CH=CH$_2$ |
| CH$_3$ | CH$_2$CH(CH$_3$)$_2$ | C$_5$H$_9$ | CH$_2$CH$_2$CH=CH$_2$ |
| CH$_2$CH$_3$ | CH$_2$CH$_2$CH(CH$_3$)$_2$ | C$_6$H$_{11}$ | CH$_2$CH$_2$(CF$_2$)$_7$CF$_3$ |
| CH$_2$CH$_2$CH$_3$ | C(CH$_3$)$_2$CH(CH$_3$)$_2$ | C$_7$H$_{13}$ | CF$_3$ |
| CH$_2$(CH$_2$)$_2$CH$_3$ | CH(C(CH$_3$)$_3$)CH(CH$_3$)$_2$ | C$_8$H$_{15}$ | N(CH$_3$)$_2$ |
| CH$_2$(CH$_2$)$_{3-30}$CH$_3$ | C(CH$_3$)$_3$ | C$_9$H$_{17}$ | N(C$_2$H$_5$)$_2$ |
| CH$_2$C(CH$_3$)$_3$ | CH$_2$Si(CH$_3$)$_3$ | C$_6$H$_5$ | OC(CH$_3$)$_3$ |
| CH=CH$_2$ | CH$_2$Ph | CH$_2$SiR$_3$ | |

The effective Group 8–15 element cocatalyst complexes of the invention are, in a preferable embodiment, derived from an ionic salt, comprising a 4-coordinate Group 10–14 element anionic complex, where $A^-$ can be represented as:

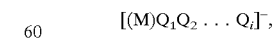

where M is one or more Group 10–15 metalloid or metal, preferably boron or aluminum, and either each Q is ligand effective for providing electronic or steric effects rendering $[(M')Q_1Q_2 \ldots Q_n]^-$ suitable as a noncoordinating anion as that is understood in the art, or a sufficient number of Q are such that $[(M')Q_1Q_2 \ldots Q_n]^-$ as a whole is an effective noncoordinating or weakly anion. Exemplary Q substituents specifically include fluorinated aryl groups, preferably perfluorinated aryl groups, and include substituted Q groups having substituents additional to the fluorine substitution, such as fluorinated hydrocarbyl groups. Preferred fluorinated aryl groups include phenyl, biphenyl, napthyl and derivatives thereof The disclosures of U.S. Pat. Nos. 5,198,401, 5,296,433, 5,278,119, 5,447,895, 5,688,634, 5,895,771, WO 93/02099, WO 97/29845, WO 99/43717, WO 99/42467 and copending U.S. application Ser. No. 09/261,627, filed Mar. 3, 1999, U.S. Pat. No. 6,262,202 and its equivalent WO 99/45042 are particularly instructive as to suitable Q substituents and are incorporated by reference for purposes of U.S. patent practice.

Additional suitable anions are known in the art and will be suitable for use with the metallocene catalysts of the invention. See U.S. Pat. No. 5,483,014, weakly coordinating anions from borane, carborane, borate, carborate, metalloborane, or metallocarborane complexes are described and exemplified. See also, the review articles by S. H. Strauss, "The Search for Larger and More Weakly Coordinating Anions", *Chem. Rev.*, 93, 927–942 (1993) and C. A. Red, "Carboranes: A New Class of Weakly Coordinating Anions for Strong Electrophiles, Oxidants and Superacids", *Acc. Chem. Res.*, 31, 133–139 (1998).

In particular embodiments one Q group, or ligand, of the anionic complex may also be bonded to a metal/metalloid oxide support or polymeric support. See, for example, U.S. Pat. Nos. 5,427,991 and 5,939,347, each incorporated by reference for purposes of U.S. patent practice. Metal or metalloid oxide supports of the described bonding method for the invention include any metal/metalloid oxides, preferably those having surface hydroxyl groups exhibiting a pKa equal to or less than that observed for amorphous silica, i.e., pKa less than or equal to about 11. Accordingly any of the conventionally known silica support materials that retain hydroxyl groups after dehydration treatment methods will be suitable in accordance with the invention. Because of availability, both of silica and silica containing metal oxide based supports, for example, silica-alumina, are preferred. Silica particles, gels and glass beads are most typical.

Polymeric supports are preferably hydroxyl-functional-group-containing polymeric substrates, but functional groups may be any of the primary alkyl amines, secondary alkyl amines, and others, where the groups are structurally incorporated in a polymeric chain and capable of a acid-base reaction with the Lewis acid such that a ligand filling one coordination site of the Group 13 element is protonated and replaced by the polymer incorporated functionality. See, for example, the functional group containing polymers of U.S. Pat. No. 5,288,677, the functionalized polymers of U.S. Pat. No. 5,427,991 and the descriptions in copending applications U.S. Ser. No. 09/277,339, filed Mar. 26, 1999, and its equivalent PCT/99US/06135, and U.S. Ser. No. 09/092,752, filed Jun. 5, 1998, U.S. Pat. No. 6,100,214 and its equivalent WO 98/55518. All are incorporated by reference for purposes of U.S. patent practice.

Other known methods for supporting catalyst systems comprising a noncoordinating anion cocatalyst will also be suitable as means for supporting the catalyst complexes of this invention. Thus the catalyst complexes of the invention may also physically deposited on or affixed to a suitable support material. See, for example, the teachings of WO 91/09882, WO 93/11172, WO 96/35726 and U.S. Pat. Nos 4,463,135, and 5,610,115.

Transition metal compounds suitable as olefin polymerization catalysts by coordination or insertion polymerization in accordance with the invention will include the known organometallic transition metal compounds useful in traditional Ziegler-Natta coordination polymerization, particularly the metallocene compounds known to be useful in coordination polymerization, when such compounds are capable of catalytic activation by the cocatalyst activators described for the invention. These will typically include Group 3–10 transition metal compounds wherein at least one metal ligand can be abstracted by the cocatalyst activators, particularly those ligands including hydride, hydrocarbyl, and hydrocarbylsilyl, and lower alkyl-substituted ($C_1$–$C_{10}$) derivatives of those. Ligands capable of abstraction and transition metal compounds comprising them include those metallocenes described in the background art, see for example U.S. Pat. No. 5,198,401 and WO 92/00333. Syntheses of these compounds are well known from the published literature. Additionally, where the metal ligands include halogen, amido or alkoxy moieties (for example, biscyclopentadienyl zirconium dichloride) which are not capable of abstraction with the activating cocatalysts of the invention, they can be converted into suitable ligands via known alkylation reactions with organometallic compounds such as lithium or aluminum hydrides or alkyls, alkylalumoxanes, Grignard reagents, etc. See also EP-A1-0 570 982 for the reaction of organoaluminum compounds with dihalo-substituted metallocene compounds prior to addition of activating anion compounds. All documents are incorporated by reference for purposes of U.S. patent practice.

Additional description of metallocene compounds which comprise, or can be alkylated to comprise, at least one ligand capable of abstraction to form a catalytically active transition metal cation appear in the patent literature, e.g., EP-A-0 129 368, U.S. Pat. Nos. 4,871,705, 4,937,299, 5,324,800 EP-A-0 418 044, EP-A-0 591 756, WO-A-92/00333, WO-A-94/01471 and WO 97/22635. Such metallocene compounds can be described for this invention as mono- or biscyclopentadienyl substituted Group 3, 4, 5, or 6 transition metal compounds wherein the ancillary ligands may be themselves substituted with one or more groups and may be bridged to each other, or may be bridged through a heteroatom to the transition metal. The size and constituency of the ancillary ligands and bridging elements are not critical to the preparation of the ionic catalyst systems of the invention but should be selected in the literature described manner to enhance the polymerization activity and polymer characteristics being sought. Preferably the cyclopentadienyl rings (including substituted cyclopentadienyl-based fused ring systems, such as indenyl, fluorenyl, azulenyl, or substituted analogs of them), when bridged to each other, will be lower alkyl-substituted ($C_1$–$C_6$) in the 2 position (without or without a similar 4-position substituent in the fused ring systems) and may additionally comprise alkyl, cycloalkyl, aryl, alkylaryl and or arylalkyl substituents, the latter as linear, branched or cyclic structures including multi-ring structures, for example, those of U.S. Pat. Nos. 5,278,264 and 5,304,614. Such substituents should each have essentially hydrocarbyl characteristics and will typically contain up to 30 carbon atoms but may be heteroatom containing with 1–5 non-hydrogen/carbon atoms, e.g., N, S, O, P, Ge, B and Si. All documents are incorporated by reference for purposes of U.S. patent practice.

Metallocene compounds suitable for the preparation of linear polyethylene or ethylene-containing copolymers (where copolymer means comprising at least two different monomers) are essentially any of those known in the art, see again WO-A-92/00333 and U.S. Pat. Nos. 5,001,205, 5,198, 401, 5,324,800, 5,304,614 and 5,308,816, for specific listings. Selection of metallocene compounds for use to make isotactic or syndiotactic polypropylene, and their syntheses, are well-known in the art, specific reference may be made to both patent literature and academic, see for example *Journal of organometallic Chemistry* 369, 359–370 (1989). Typically those catalysts are stereorigid asymmetric, chiral or bridged chiral metallocenes. See, for example, U.S. Pat. Nos. 4,892,851, 5,017,714, 5,296,434, 5,278,264, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, *Organometallics* 1994, 13, 954–963, and "ansa-Zirconocene Polymerization Catalysts with Annelated Ring Ligands-Effects on Catalytic Activity and Polymer Chain Lengths", Brinzinger, H., et al, *Organometallics* 1994, 13, 964–970, and documents referred to therein. Though many above are directed to catalyst systems with alumoxane activators, the analogous metallocene compounds will be useful with the cocatalyst activators of this invention for active coordination catalyst systems, when the halogen, amide or alkoxy containing ligands of the metals (where occurring) are replaced with ligands capable of abstraction, for example, via an alkylation reaction as described above, and another is a group into which the ethylene group —C=C— may insert, for example, hydride, alkyl, or silyl. See additional description in G. G. Hlatky, "Metallocene catalysts for olefin polymerization Annual review of 1996", *Coordination Chemistry Reviews,* 181, 243–296 (Elsevier Science, 1999). All documents are incorporated by reference for purposes of U.S. patent practice.

Representative metallocene compounds can have the formula:

$$L^A L^B L^C_i MDE$$

where, $L^A$ is a substituted cyclopentadienyl or heterocyclopentadienyl ancillary ligand π-bonded to M; $L^B$ is a member of the class of ancillary ligands defined for $L_A$, or is J, a heteroatom ancillary ligand σ-bonded to M; the $L^A$ and $L^B$ ligands may be covalently bridged together through one or more Group 13–16 element-containing linking groups; $L^C_i$ is an optional neutral, non-oxidizing ligand having a dative bond to M (i equals 0 to 3); M is a Group 4 or 5 transition metal; and, D and E are independently monoanionic labile ligands, each having a σ-bond to M, optionally bridged to each other or $L^A$ or $L^B$, which can be broken for abstraction purposes by a suitable activator and into which a polymerizable monomer or macromonomer can insert for coordination polymerization. Also, the use of hetero-atom containing rings or fused rings, where a non-carbon Group 13, 14, 15 or 16 atom replaces one of the ring carbons is considered for this specification to be within the terms "cyclopentadienyl", "indenyl", and "fluorenyl". See, for example, the background and teachings of WO 98/37106, having common priority with U.S. Ser. No. 08/999,214, filed Dec. 29, 1997, and WO 98/41530, having common priority with U.S. Ser. No. 09/042,378, filed Mar. 13, 1998, abandoned both incorporated by reference for purposes of U.S. patent practice.

Non-limiting representative metallocene compounds include mono-cyclopentadienyl compounds such as pentamethylcyclopentadienyltitanium isopropoxide, pentamethylcyclopentadienyltribenzyl titanium, dimethylsilyltetramethyl-cyclopentadienyl-tert-butylamido titanium dichloride, pentamethylcyclopentadienyl titanium trimethyl, dimethylsilyltetramethyl-cyclopentadienyl-tert-butylamido zirconium dimethyl, dimethylsilyltetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, pentamethylcyclopentadienylcyclopentadienyl zirconium dimethyl, (tetramethylcyclopentadienyl)(n-propylcyclopentadienyl) zirconium dimethyl; bridged bis-cyclopentadienyl compounds such as dimethylsilylbis(tetrahydroindenyl) zirconium dichloride and silacyclobutyl (tetramethylcyclopentadienyl)(n-propylcyclopentadienyl) zirconium dimethyl; bridged bis-indenyl compounds such as dimethylsily-bisindenyl zirconium dichloride, dimethylsilybisindenyl hafnium dimethyl, dimethylsilylbis(2-methylbenzindenyl)zirconium dichloride, dimethylsilylbis (2-methylbenzindenyl)zirconium dimethyl; and fluorenyl ligand-containing compounds, e.g., diphenylmethyl (fluorenyl)(cyclopentadienyl)zirconium dimethyl; and the additional mono- and biscyclopentadienyl compounds such as those listed and described in U.S. Pat. Nos. 5,017,714, 5,324,800, WO 92/00333 and EP-A-0 591 756. All documents are incorporated by reference for purposes of U.S. patent practice.

Representative traditional Ziegler-Natta transition metal compounds include tetrabenzyl zirconium, tetra bis (trimethylsilylmethyl)zirconium, oxotris (trimethlsilylmethyl)vanadium, tetrabenzyl hafnium, tetrabenzyl titanium, bis(hexamethyl disilazido)dimethyl titanium, tris(trimethyl silyl methyl)niobium dichloride, tris (trimethylsilylmethyl)tantalum dichloride. The important features of such compositions for coordination polymerization are the ligand capable of abstraction and that ligand into which the ethylene (olefinic) group can be inserted. These features enable the ligand abstraction from the transition metal compound and the concomitant formation of the ionic catalyst composition of the invention.

Additional organometallic transition metal compounds suitable as olefin polymerization catalysts in accordance with the invention will be any of those Group 3–11 that can be converted by ligand abstraction into a catalytically active cation and stabilized in that active electronic state by a noncoordinating or weakly coordinating anion sufficiently labile to be displaced by an olefinically unsaturated monomer such as ethylene.

Exemplary compounds include those described in the patent literature. International Patent Publications WO 96/23010, WO 97/48735 and Gibson, et. al., Chem. Comm., pp. 849–850 (1998), disclose diimine-based ligands for Group 8–10 metal compounds shown to be suitable for ionic activation and olefin polymerization. See also WO 97/48735. Transition metal polymerization catalyst systems from Group 5–10 metals wherein the active transition metal center is in a high oxidation state and stabilized by low coordination number polyanionic ancillary ligand systems are described in U.S. Pat. No. 5,502,124 and its divisional U.S. Pat. No. 5,504,049. See also the Group 5 organometallic catalyst compounds of U.S. Pat. No. 5,851,945 and the tridentate ligand containing Group 5–10 organometallic catalyst compounds of copending U.S. application Ser. No. 09/302243, filed Apr. 29, 1999, U.S. Pat. No. 6,294,495 and its equivalent PCT/US99/09306. Group 11 catalyst precursor compounds, capable of activation with ionizing cocatalysts, useful for olefins and vinyl group-containing polar monomers are described and exemplified in WO 99/30822 and its priority document, including U.S. Patent application Ser. no. 08/991,160, filed Dec. 16, 1997 abandoned. Each of these documents is incorporated by reference for the purposes of U.S. patent practice.

U.S. Pat. No. 5,318,935 describes bridged and unbridged bisamido transition metal catalyst compounds of Group 4 metals capable of insertion polymerization of (-olefins. Bridged bis(arylamido) Group 4 compounds for olefin polymerization are described by D. H. McConville, et al, in *Organometallics* 1995, 14, 5478–5480. Synthesis methods and compound characterization are presented. Further work appearing in D. H. McConville, et al, *Macromolecules* 1996, 29, 5241–5243, described bridged bis(arylamido) Group 4 compounds that are active catalysts for polymerization of 1-hexene. Additional transition metal compounds suitable in accordance with the invention include those described in WO 96/40805. Cationic Group 3 or Lanthanide metal complexes for coordination polymerization of olefins is disclosed in copending U.S. application Ser. No. 09/408050, filed Sep. 29, 1999, and its equivalent PCT/US99/22690. The precursor metal compounds are stabilized by a monoanionic bidentate ancillary ligand and two monoanionic ligands and are capable of activation with the ionic cocatalysts of the invention. Each of these documents is incorporated by reference for the purposes of U.S. patent practice.

Additional description of suitable organometallic or organometalloid catalyst precursor compounds may be found in the literature, any of such will be suitable where comprising, or where capable of alkylation to comprise, ligands capable of ionizing abstraction. See, for instance, V. C. Gibson, et al, "The Search for New-Generation Olefin Polymerization Catalysts: Life Beyond Metallocenes", *Angew. Chem. Int. Ed*, 38, 428–447 (1999).

When using the above catalysts of the invention, the total catalyst system will generally additionally comprise one or more organometallic compound. Such compounds as used in this application and its claims is meant to include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of organometallic compound will still normally be used in the polymerization process itself.

Typically these compounds will be organometallic compounds such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, and isobutyl aluminumoxane. Those compounds having bulky or $C_6$–$C_{20}$ linear hydrocarbyl substituents covalently bound to the metal or metalloid center being preferred to minimize adverse interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, or tri-n-dodecylaluminum. When alumoxane is used as activator, any excess over the amount needed to activate the catalysts present can act as a poison scavenger compound and additional organometallic compounds may not be necessary. Alumoxanes also may be used in scavenging amounts with other means of activation, e.g., methylalumoxane and triisobutyl-aluminoxane with boron-based activators. The amount of such compounds to be used with catalyst compounds of the inventions is minimized during polymerization reactions to that amount effective to enhance activity (and with that amount necessary for activation of the catalyst compounds if used in a dual role) since excess amounts may act as catalyst poisons.

The catalyst complexes of the invention are useful in polymerization of unsaturated monomers conventionally known to be polymerizable under coordination polymerization using metallocenes. Such conditions are well known and include solution polymerization, slurry polymerization, gas-phase polymerization, and high-pressure polymerization. The catalyst of the invention may be supported (preferably as described above) and as such will be particularly useful in the known operating modes employing fixed-bed, moving-bed, fluid-bed, slurry or solution processes conducted in single, series or parallel reactors. Pre-polymerization of supported catalyst of the invention may also be used for further control of polymer particle morphology in typical slurry or gas phase reaction processes in accordance with conventional teachings.

In alternative embodiments of olefin polymerization methods for this invention, the catalyst system is employed in liquid phase (solution, slurry, suspension, bulk phase or combinations thereof), in high-pressure liquid or supercritical fluid phase, or in gas phase. Each of these processes may also be employed in singular, parallel or series reactors. The liquid processes comprise contacting olefin monomers with the above described catalyst system in a suitable diluent or solvent and allowing said monomers to react for a sufficient time to produce the invention copolymers. Hydrocarbyl solvents are suitable, both aliphatic and aromatic, hexane is preferred. Bulk and slurry processes are typically done by contacting the catalysts with a slurry of liquid monomer, the catalyst system being supported. Gas phase processes typically use a supported catalyst and are conducted in any manner known to be suitable for ethylene homopolymers or copolymers prepared by coordination polymerization. Illustrative examples may be found in U.S. Pat. Nos. 4,543,399, 4,588,790, 5,028,670, 5,382,638, 5352,749, 5,408,017, 5,436,304, 5,453,471, and 5,463,999, 5,767,208 and WO 95/07942. Each is incorporated by reference for purposes of U.S. patent practice.

Generally speaking the polymerization reaction temperature can vary from about 40° C. to about 250° C. Preferably the polymerization reaction temperature will be from 60° C. to 220°. The pressure can vary from about 1 mm Hg to 2500 bar, preferably from 0.1 bar to 1600 bar, most preferably from 1.0 to 500 bar.

For homogenous solution polymerization best results may be obtained when the quantity and type of solvent used to introduce the catalyst is controlled as well as the manner of introduction. Generally it is believed preferable to achieve full solution and avoid slurried systems, and hence fairly high concentrations of the catalyst, at low temperatures and use low solvent amounts. The ease with which these objectives can be achieved may vary with the solubility of the non-coordinating anion and transition metal components. Some of the more active catalysts or those likely to give a higher mol weight at a given temperature, may have reduced solubility or may be modified for increased solubility.

The invention is hence especially suitable for use with solution polymerization using bridged fluorenyl systems and/or naphthyl containing non-coordinating anions optimized for higher temperature and/or higher molecular weight production at temperature in excess of 130 or even 170 degrees C. and up to 250 degrees C.

Linear polyethylene, including high and ultra-high molecular weight polyethylenes, including both homo- and copolymers with other alpha-olefin monomers, alpha-olefinic and/or non-conjugated diolefins, for example, $C_3$–$C_{20}$ olefins, diolefins or cyclic olefins, are produced by adding ethylene, and optionally one or more of the other monomers, to a reaction vessel under low pressure (typically<50 bar), at a typical temperature of 40–250° C. with the invention catalyst that has been slurried with a solvent, such as hexane or toluene. Heat of polymerization is typically removed by cooling. Gas phase polymerization can be conducted, for example, in a continuous fluid bed gas-phase reactor operated at 2000–3000 kPa and 60–160° C., using hydrogen as a reaction modifier (100–200 PPM), $C_4$–$C_8$ comonomer feedstream (0.5–1.2 mol %), and $C_2$ feedstream (25–35 mol %). See, U.S. Pat. Nos. 4,543,399, 4,588,790, 5,028,670 and 5,405,922 and 5,462,999, which are incorporated by reference for purposes of U.S. patent practice.

Ethylene-α-olefin (including ethylene-cyclic olefin and ethylene-α-olefin-diolefin) elastomers of high molecular weight and low crystallinity can be prepared utilizing the catalysts of the invention under traditional solution polymerization processes or by introducing ethylene gas into a slurry utilizing the α-olefin or cyclic olefin or mixture thereof with other monomers, polymerizable and not, as a polymerization diluent in which the invention catalyst is suspended. Typical ethylene pressures will be between 10 and 1000 psig (69–6895 kPa) and the polymerization diluent temperature will typically be between 40 and 160° C. The process can be carried out in a stirred tank reactor, or more than one operated in series or parallel. See the general disclosure of U.S. Pat. No. 5,001,205 for general process conditions. See also, International Applications WO 96/33227 and WO 97/22639. All documents are incorporated by reference for description of polymerization processes, metallocene selection and useful scavenging compounds.

Other olefinically unsaturated monomers besides those specifically described above may be polymerized using the catalysts according to the invention, for example, styrene, alkyl-substituted styrenes, isobutylene and other geminally disubstituted olefins, ethylidene norbornene, norbornadiene, dicyclopentadiene, and other olefinically-unsaturated monomers, including other cyclic olefins, such as cyclopentene, norbornene, alkyl-substituted norbornenes, and vinyl group-containing polar monomers capable of coordination polymerization. See, for example, U.S. Pat. Nos. 5,635,573, 5,763,556, and WO 99/30822. Additionally, alpha-olefinic macromonomers of up to 1000 mer units, or more, may also be incorporated by copolymerization yielding branch-containing olefin polymers. Additionally oligomerization, dimerization, hydrogenation, olefin/carbon monoxide copolymerization, hydroformulation, hydrosilation, hydroamination and related catalytic reactions employing organometallic cationic complexes can be accomplished using the cocatalyst complexes of the invention with selected organometallic compounds as known in the art.

The catalyst compositions of the invention can be used as described above individually for coordination polymerization or can be mixed to prepare polymer blends with other known olefin polymerization catalyst compounds. By selection of monomers, blends of coordination catalyst compounds, polymer blends can be prepared under polymerization conditions analogous to those using individual catalyst compositions. Polymers having increased MWD for improved processing and other traditional benefits available from polymers made with mixed catalyst systems can thus be achieved.

The formation of blended polymers can be achieved ex situ through mechanical blending or in situ through the use of a mixed catalyst system. It is generally believed that in situ blending provides a more homogeneous product and allows the blend to be produced in one step. The use of mixed catalyst systems for in situ blending involves combining more than one catalyst in the same reactor to simultaneously produce multiple distinct polymer products. This method requires additional catalyst synthesis and the various catalyst components must be matched for their activities, the polymer products they generate at specific conditions, and their response to changes in polymerization conditions.

The following examples are presented to illustrate the foregoing discussion. All parts, proportions and percentages are by weight unless otherwise indicated. All examples were carried out in dry, oxygen-free environments and solvents. Although the examples may be directed to certain embodiments of the present invention, they are not to be viewed as limiting the invention in any specific respect. In these examples certain abbreviations are used to facilitate the description. These include standard chemical abbreviations for the elements and certain commonly accepted abbreviations, such as Me=methyl, Et=ethyl, t-Bu=tertiary-butyl, Cp=cyclopentadienyl, Ind=indenyl, Flu=fluorenyl, THF (or thf)=tetrahydrofuran, Ph=phenyl, and pfp=pentafluorophenyl.

All molecular weights are weight average molecular weight unless otherwise noted. Molecular weights (weight average molecular weight (Mw) and number average molecular weight (Mn) were measured by Gel Permeation Chromatography, unless otherwise noted, using a Waters 150 Gel Permeation Chromatograph equipped with a differential refractive index (DRI) and low angle light scattering (LS) detectors and calibrated using polystyrene standards. Samples were run in 1,2,4-trichlorobenzene (135° C.) using three Polymer Laboratories PC Gel mixed B columns in series. This general technique is discussed in "Liquid Chromatography of Polymers and Related Materials II" J. Cazes Ed., Marcel Decker, 1981, page 207, which is incorporated by reference for purposes of U.S. Patent practice herein. No corrections for column spreading were employed; however, data on generally accepted standards, e.g. National Bureau of Standards Polyethylene 1475, demonstrated a precision with 0.2 units for Mw/Mn which was calculated from elution times.

EXAMPLES

Polymerization Examples

Example 1a

Polymerization Procedure

Each polymerization example that follows was conducted as follows. Under a nitrogen atmosphere, a 1-L autoclave was charged with hexane (460 mL) and trioctylaluminum (0.04 mL of a 25 wt % solution in hexane diluted with hexane (10 mL)). The autoclave was stirred at ca. 1000 rpm, heated to 113.6° C.±0.4° C. (press=47.2±0.5 psig, 426.7±3.4 mPa) then pressurized with propylene to 103.3±0.3 psig (813.6±3.1 mPa) then ethylene to 251 (psig 1730.6 mPa). Ethylene flow into the reactor was allowed during the copolymerization. An activator ("Act") solution in hexane 3.94×10$^{-5}$ M, [(3,5-(Et$_3$Si)$_2$—Ph)$_3$C]$^+$[(pfp)$_4$B]—, (20 mL, 0.79 μmol) was pumped into the reactor. Then an organometallic catalyst precursor compound ("Cat") solution in hexane 3.97×10$^{-5}$ M, (p-Et$_3$Si—Ph)$_2$C(2,7-(t-BU)2Flu)(Cp)HfMe$_2$, was added at a variable rate sufficient to maintain ethylene flow into the reactor at <1 L/min and the reaction exotherm <0.5° C. The mean temperature during the polymerizations was 113.7° C.±0.5° C. Ethylene uptake was monitored with a calibrated mass-flow transducer. The polymerization was halted after ca. 11 g of polymer was produced. The reactor was vented and cooled. The polymer solution was poured from the reactor into a large beaker. The reactor was rinsed with additional hot hexane (ca. 500 mL). The polymer solutions were combined then treated with a stream of nitrogen to remove hexane; the polymer was further dried under vacuum at 80° C. Polymerization data is given in Table 1.

Example 1b

Polymerization Example

The procedure of 1a was repeated.

Example 1c

Polymerization Example

The procedure of 1a was repeated.

Example 2a

Polymerization Reaction

The general of 1a. was conducted with an organometallic catalyst precursor substitution: A 5.0×10$^{-5}$ M rac-Me$_2$Si(Ind)$_2$HfMe$_2$ solution in hexane was in used place of the Cat solution in example 1a Example 2b Polymerization Reaction The procedure of 2a was repeated.

Example 3a

Comparative Example: Act B(C$_6$F$_5$)$_3$

The procedure of 1a was followed with prior art hexane soluble activator. A 1.5×10$^{-4}$ M tris(perfluorophenyl)borane (B(C$_6$F$_5$)$_3$) solution in hexane (25 mL, 3.78 μmol) was pumped into the reactor in place of the activator solution used in example 1a. Due to low activity, the polymerization was halted after 2.92 g of polymer was prepared.

Example 3b

Comparative Example: Act B(C$_6$F$_5$)$_3$

The procedure of 3a was repeated. Due to low activity, the polymerization was halted after 0.7 g of polymer was prepared.

Comparison of examples 3a,b and 1a–c reveal that [(3,5-(Et$_3$Si)$_2$—Ph)$_3$C]$^+$[(pfp)$_4$B]— is a more effective activator than (C$_6$F$_5$)$_3$B. In exp. 1a–c, 0.11, 0.13 μmol of p-Et$_3$Si—Ph)$_2$C(2,7-(t-Bu)$_2$Flu)(Cp)HfMe$_2$ was added to a reactor containing 0.79 μmol of [(3,5-(Et$_3$Si)$_2$—Ph)$_3$C]+[(pfp)$_4$B]—: 10.33, 12.41 g of polymer were obtained. In examples 3a,b much larger amounts of (p-Et$_3$Si—Ph)$_2$C(2,7-(t-Bu)$^3$Flu)(Cp)HfMe$_2$ (0.7, 0.9 μmol) and (C$_6$F$_5$)$_3$B (3.8 μmol) were employed but very little polymer (2.92, 0.7 g) was obtained.

Example 4a

Polymerization Example: Act[(3,5-(Et$_3$Si)$_2$—Ph)$_3$C]+[(pfp)$_4$B]—

The procedure of example 1a was repeated. A mixture of [(3,5-(Et$_3$Si)$_2$—Ph)$_3$C]+[(pfp)$_4$B]$^-$ (5.0 mg, 3.1 μmol) and hexane (80 mL) was stirred for 15 min then filtered through a 0.45 μm filter prior to pumping into the reactor (20 mL).

Example 4b

Polymerization Example: Act[((3,5-(Et$_3$Si)$_2$—Ph)$_3$C]+[(pfp)$_4$B]$^-$

The procedure of example 4a was repeated using the same filtered solution.

Example 4c

Comparative Example: Act[Ph$_3$C]$^+$[B(C$_6$F$_5$)$_4$]$^-$

The procedure of example 1a was followed with an activator compound substitution: A mixture of tritylcarbenium tetrakis(pentafluorophenyl)borate, ([Ph$_3$C]$^+$[B(C$_6$F$^5$)$_4$]$^-$ (5.1 mg, 5.5 μmol) and hexane (80 mL), was stirred for 15 min then filtered through a 0.45 μm filter prior to pumping into the reactor (20 mL).

Example 4d

Comparative Example: Act[Ph$_3$C]$^+$[B(C$_6$F$_5$)$_4$]$^-$

The procedure of example 4c was repeated using the same filtered solution.

Experiments 4a–4d illustrate an important consequence of the much higher hexane solubility of the activator [(3,5-(Et$_3$Si)$_2$—Ph)$_3$C]+[(pfp)$_4$B]— relative to Ph$_3$C$^+$B(C$_6$F$_5$)$_4$$^-$. Because [(3,5-(Et$_3$Si)$_2$—Ph)$_3$C]+[(pfp)$_4$B]— is more soluble than Ph$_3$C$^+$B(C$_6$F$_5$)$_4$$^-$, larger amounts of R1 can be pumped into the reactor. Polymerizations conducted with (p-Et$_3$Si—Ph)$_2$C(2,7-(t-Bu)$_2$Flu)(Cp)HfMe$_2$/[(3,5-(Et$_3$Si)$_2$—Ph)$_3$C]+[(pfp)$_4$B]— produced 10.62 and 11.37 g of polymer while the corresponding p-Et$_3$Si—Ph)$_2$C(2,7-(t-Bu)$_2$Flu)(Cp)HfMe$_2$/Ph$_3$C$^+$ polymerizations produced almost no polymer (0.07, 0.08 g) even though ca. 3 times the amounts of (p-Et$_3$Si—Ph)$_2$C(2,7-(t-Bu)$_2$Flu)(Cp)HfMe$_2$ were used in examples 4c–d.

TABLE 1

POLYMERIZATION RESULTS

| Ex # | μmol Cat | μmol Act | Polymer mass | Wt % C$_3$ (IR) | M$_w$ (LS) | M$_w$/M$_n$ (DRI) |
|---|---|---|---|---|---|---|
| 1a | 0.129 | 0.79 | 12.41 | 32 | 629427 | 1.85 |
| 1b | 0.11 | 0.79 | 11.79 | 31 | 647659 | 1.7 |
| 1c | 0.118 | 0.79 | 10.33 | 32 | 575956 | 1.9 |
| 2a | 0.045 | 0.79 | 10.69 | 26.5 | a | a |
| 2b | 0.164 | 0.79 | 11.28 | 27 | a | a |
| 3a(C) | 0.698 | 3.8 | 2.92 | 32 | 573913 | 1.9 |
| 3b(C) | 0.893 | 3.8 | 0.7 | b | b | b |
| 4a | 0.067 | 0.79$^c$ | 10.62 | 31 | 622215 | 1.9 |
| 4b | 0.067 | 0.79$^c$ | 11.36 | 32 | 595706 | 2.0 |

TABLE 1-continued

POLYMERIZATION RESULTS

| Ex # | μmol Cat | μmol Act | Polymer mass | Wt % $C_3$ (IR) | $M_w$ (LS) | $M_w/M_n$ (DRI) |
|---|---|---|---|---|---|---|
| 4c(C) | 0.194 | d | 0.07 | b | b | b |
| 4d(C) | 0.225 | d | 0.08 | b | b | b | a Polymer not analyzed by GPC. Melt Indices measured at 190° C. employing a 2.16 kg weight; exp. 2a, 0.284 g/(10 min); exp. 2b, 0.314 g/(10 min).
b not measured
c, d R1 is completely soluble, exp. 4a, b, while $Ph_3C^+$ $B(pfp)_4^-$ has little solubility under the conditions
d μmol of $Ph_3C^+$ $B(pfp)_4^-$ A added is unknown.

Example 5

Synthesis of Invention Act[((3,5-$(Et_3Si)_2$—Ph)$_3$C]+ [B($C_6F_5$)$_4$]$^-$ (1) 1,3-$Br_2$ 5-($Et_3Si$)benzene. A 3 L flask was charged under nitrogen with 1,3,5-$Br_3$benzene (100 g, 0.318 mol), $OEt_2$ (1 L), cooled in a dry ice/2-PrOH bath then treated with one equivalent of n-BuLi (79.9 mL of a 3.98 M solution of BuLi in pentane, hexane). After stirring for 30 min, $Et_3SiCl$ (59 mL, 0.351 mol) was added. The mixture was allowed to slowly warm to room temperature. The flask was brought into the drybox then the pentane was removed with a stream of nitrogen gas. The solids were extracted with pentane (4×20 mL). The pentane washings were filtered the salts were washed with pentane (5×20 mL). The product was isolated from the pentane washings by vacuum distillation, bp=89–95° C. yield (89.67 g, 0.256 mol).

(2) 1-Br 3,5-$(Et_3Si)_2$benzene. A 3 L flask was charged with 1 (86.86 g, 0.248 mol), anhydrous ether, sparged with nitrogen, cooled in a dry ice/2-PrOH bath then treated with one equivalent of n-BuLi (39.75 mL of a 6.25 M BuLi/hexane solution diluted to 150 mL with pentane). After stirring for 45 min, $Et_3SiCl$ (60.5 mL, 0.36 mol) was added. The mixture was allowed to slowly warm to room temperature overnight. The flask was brought into the drybox then the pentane was removed with a stream of nitrogen gas. The solids were extracted with pentane (300 mL). The pentane washings were filtered then vacuum distilled. 1 and 2 co-distilled. The combined mixture (tot. 46.9 g) containing 12.6% 1,3-$Br_2$ 5-($Et_3Si$)benzene (5.43 g, 15.51 mmol) was taken up in ether (50 mL), cooled to −80° C., treated with 2.15 M nBuLi (7.2 mL, 15.5 mmol) then stirred for ca. 60 min. $Et_3SiCl$ (10 mL, 59.6 mmol) was added then the mixture was allowed to warm to room temperature. Workup was as described above on a smaller scale. Fractional vacuum distillation gave 2 bp 160–170° C.

(3) 1-Li 3,5-$(Et_3Si)_2$benzene. A solution of 3 in $OEt_2$ was prepared from 3,5$(Et_3Si)_2$—$C_6H_4Br$ (15.1 g, 39.2 mmol), lithium metal (1.8 g, 259 mmol) and $OEt_2$ (ca. 200 mL). The solution was separated from the excess lithium. A concentration of 0.24 M was determined by titration with 4-Me-phenanthroline/nBuOH.

(4) bis-(3,5-$(Et_3Si)_2$phenyl)ketone. Dimethylcarbamyl chloride (88 μL, 0.96 mmol) was added to a 0.25 M solution of 3 in $OEt_2$ (7.6 mL, 1.9 mmol). After the exothermic reaction was complete, aqueous ammonium chloride was added then the aqueous layer extracted with ether. The ether extracts were dried, reduced to an oil then chromatographed on silica gel eluting with hexane then 5% $OEt_2$/hexane (v/v). 4 was isolated from the 5% $OEt_2$/hexane eluent. yield (0.5 g, 0.78 mmol).

(5) tris-(3,5-$(Et_3Si)_2$phenyl)methanol. 4 (0.5 g, 0.78 mmol) was taken up in $OEt_2$ (20 mL) then treated with 0.24 M 3 in $OEt_2$ (3.3 mL, 0.79 mmol). The color turned light blue then yellow. After the reaction was complete, aqueous ammonium chloride was added then the aqueous layer extracted with ether. The ether extracts were dried then reduced to an oil. yield (0.73 g, 0.77 mmol).

(6) tris-(3,5-$Et_3Si)_2$phenyl)methylchloride. 5 (0.73 g, 0.77 mmol) was taken up in dry toluene (15 mL) then heated to 50° C. Acetyl chloride (5 mL, 70.3 mmol) was added. After heating for 10 min, the temperature was raised 20° C. and the mixture was observed to reflux for 45 min then allowed to cool to room temperature. The solvent was removed by vacuum distillation. Additional toluene (20 mL) was added to the residual oil then vacuum distilled. yield (0.45 g, 0.47 mmol)

(7) (3,5-$(Et_3Si)_2$Ph)$_3$C+(($C_6F_5$)$_4$B$^-$.Li$^+$B($C_6F_5$)$_4^-$ (320 mg, 0.47 mmol) was added to a solution of 6 (0.45 g, 0.47 mmol) and methylene chloride (20 mL). Evaluation of the $^1$H NMR of the mixture revealed that the reaction conversion was only 86%: an additional aliquot of Li$^+$B($C_6F_5$)$_4^-$ (45 mg, 0.07 mmol) was added. Stirred overnight. Reduced mixture to an orange oil. Extracted product with hot hexane (3×50 mL then 1×25 mL), filtered then placed in freezer. After 2 h the solids were collected by filtration then dried. yield (394 mg, 0.245 mmol)

Example 6

Solubility Studies

A measured amount (ca. 50 mg) of activator and dry hexane (ca. 20 mL) was stirred for 30 min then the sample was filtered through a 0.45 mm filter. The [(3,5-$(Et_3Si)_2$Ph)$_3$C]+[($C_6F_5$)$_4$B]$^-$ filtrate (Act 1) was orange colored while the [$Ph_3C$]$^+$[B(pfp)$_4$]$^-$ filtrate (Act 2) was colorless. The mass of the sample was recorded then the hexane removed with a slow nitrogen stream. Weight % solubility of the activator was determined as 100 (mass solid remaining)/(mass filtered aliquot).

| Activator | Filtered Aliquot | | |
|---|---|---|---|
| | aliq. mass$^a$ | solid mass | wt % |
| Act 1 | 13141.2 | 21.7 | 0.17 |
| Act 1 | 13056.1 | 21.7 | 0.17 |
| Act 2 | 12512.6 | 0.2 | 0.002$^b$ |
| Act 2 | 13105 | 1 | 0.008$^b$ |

$^a$mass in mg
$^b$likely an upper limit of solubility.

I claim:

1. A reaction product suitable for use as a catalyst in polymerizing one or more olefinic monomers to prepare a polyolefin, said reaction product obtained by i) an organometallic catalyst compound and ii) a cocatalyst complex comprising a trialkylsilyl-substituted carbenium cation and a Group 13 element noncoordinating or weakly coordinating anion.

2. The reaction product according to claim 1 wherein said product is obtained from a cocatalyst complex as described by the following formula:

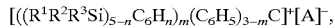

where each of $R^1$, $R^2$, and $R^3$ is independently a substituted or unsubstituted $C_1$ to $C_{10}$ branched or linear hydrocarbyl aliphatic group, n=1–4, m=1–3, and [A]⁻ is a noncoordinating or weakly coordinating anion.

3. The reaction product according to claim 1 wherein said product is obtained from the organometallic catalyst compound and the cocatalyst complex, each being dissolved separately or sequentially in a hydrocarbon solvent.

4. The product according to claim 1 wherein the solvent contains less than 10 wt % of an aromatic solvent, such as toluene and is added at a temperature of less than 300° C.

5. The product according to claim 1 wherein the product is obtained from said organometallic catalyst compound being a Group 3–10 transition metal compound capable of activation for olefin polymerization to a structurally saturated monovalent cationic state.

6. The product according to claim 1 wherein said transition metal organometallic catalyst compound is a Group 3–6 metallocene compound having the formula:

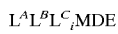

where, $L^A$ is a substituted or unsubstituted cyclopentadienyl or heterocyclopentadienyl ancillary ligand π-bonded to M; $L^B$ is a member of the class of ancillary ligands defined for $L^A$, or is J, a heteroatom ancillary ligand bonded to M; the $L^A$ and $L^B$ ligands may be covalently bridged together through one or more Group 13–16 element-containing linking groups; $L^C_i$ is an optional neutral, non-oxidizing ligand having a dative bond to M (i equals 0 to 3); M is a Group 3–6 transition metal; and, D and E are independently monoanionic labile ligands, each having a σ-bond to M, optionally bridged to each other or to $L^A$ or $L^B$, which can be broken for abstraction purposes by said cocatalyst complex and into which a polymerizable monomer or macromonomer can insert for coordination polymerization.

7. The product according to claim 1 wherein M is titanium and $L^B$ is J, a heteroatom ancillary ligand σ-bonded to M.

8. The product according to claim 1 wherein M is zirconium or hafnium and $L^B$ is independently a substituted or unsubstituted cyclopentadienyl or heterocyclopentadienyl ancillary ligand π-bonded to M.

* * * * *